United States Patent
Clarke

(10) Patent No.: US 11,184,252 B2
(45) Date of Patent: Nov. 23, 2021

(54) SYSTEMS AND METHODS FOR SECURE NETWORK FUNCTION VIRTUALIZATION LICENSE MANAGEMENT

(71) Applicant: CABLE TELEVISION LABORATORIES, INC, Louisville, CO (US)

(72) Inventor: Donald E. A. Clarke, Joplin, CO (US)

(73) Assignee: Cable Television Laboratories, Inc., Louisville, CO (US)

(*) Notice: Subject to any disclaimer, the term of this patent is extended or adjusted under 35 U.S.C. 154(b) by 33 days.

(21) Appl. No.: 16/578,013

(22) Filed: Sep. 20, 2019

(65) Prior Publication Data
US 2020/0099591 A1 Mar. 26, 2020

Related U.S. Application Data

(60) Provisional application No. 62/733,724, filed on Sep. 20, 2018.

(51) Int. Cl.
*H04L 12/24* (2006.01)
*G06F 9/455* (2018.01)
*G06F 16/182* (2019.01)

(52) U.S. Cl.
CPC .......... *H04L 41/28* (2013.01); *G06F 9/45558* (2013.01); *G06F 16/1824* (2019.01); *H04L 41/046* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 2002/0007350 A1* | 1/2002 | Yen | H04L 63/083 705/52 |
| 2017/0214608 A1* | 7/2017 | Jilani | H04L 47/35 |
| 2017/0366428 A1* | 12/2017 | Shaw | H04L 67/10 |
| 2019/0287146 A1* | 9/2019 | Maitland | H04L 41/12 |

* cited by examiner

*Primary Examiner* — Brian Whipple
(74) *Attorney, Agent, or Firm* — Armstrong Teasdale LLP

(57) ABSTRACT

A system for secure management of licensing and distributing virtual network functions (VNF) is provided. The system includes a VNF license manager, a VNF repository, and a VNF license database. The VNF license manager is in communication with the VNF repository and the VNF license database. The VNF license manager is programmed to receive a request for access to a first VNF from a virtual network. The virtual network is configured to execute the first VNF. The VNF license manager is also programmed to determine if the virtual network may access the first VNF based on one or more policies associated with the first VNF. If the virtual network may access the first VNF, the VNF license manager is programmed to retrieve the first VNF from the VNF repository and transmit the first VNF to the virtual network.

17 Claims, 3 Drawing Sheets

SYSTEMS AND METHODS FOR SECURE NETWORK FUNCTION VIRTUALIZATION LICENSE MANAGEMENT

CROSS REFERENCE TO RELATED APPLICATIONS

This application claims the benefit of and priority to U.S. Provisional Patent Application Ser. No. 62/733,724, filed Sep. 20, 2018, which is incorporated herein by reference in its entirety.

BACKGROUND

The field of the disclosure relates generally to management of licenses for virtual network functions, and more particularly, to secure management of licensing and distributing virtual network functions.

The European Telecommunication Standards Institute (ETSI) has generated the Management and Orchestration (MANO) architecture for Network Function Virtualization (NFV). This architecture is designed as a blueprint for developing products and further standards. However, the architecture as presented requires further architectural development to ensure implemental development.

One of the issues is the communication between the virtual network function manager (VNFM) and each virtual machine that implements virtualized network function component instantiation (VNFCI) as the original architecture. In addition, there are distribution and security issues with communication with the virtualized infrastructure manager (VIM). These issues include the supply chain of providing licensed virtualized network functions. Physical network functions are usually provided through a physical box from a single supplier preloaded with the software. The licenses are bundle with the physical box. And the long term software license is tied to the hardware lifecycle, when the hardware changes the software may need to be updated as well. Furthermore the software may only be able to work on specific hardware. Accordingly, improvements to the architecture could provide improvements to the security and efficiency of these systems and allow for the separation of the software cycle of functionality from the hardware cycle.

BRIEF SUMMARY

In an embodiment, a system for secure management of licensing and distributing virtual network functions (VNF) is provided. The system includes a VNF license manager, a VNF repository for storing a plurality of VNFs including a first VNF, and a VNF license database for storing a plurality of polices associated with the plurality of VNFs. The VNF license manager is in communication with the VNF repository and the VNF license database. The VNF license manager is programmed to receive a request for access to the first VNF from a virtual network. The virtual network is configured to execute the first VNF. The VNF license manager is also programmed to determine if the virtual network may access the first VNF based on one or more policies of the plurality of policies associated with the first VNF. If the virtual network may access the first VNF, the VNF license manager is programmed to retrieve the first VNF from the VNF repository and transmit the first VNF to the virtual network.

In an embodiment, a virtual network function (VNF) licensing agent is provided. The VNF licensing agent is in communication with at least one network function virtualization (NFV) architecture. The VNF licensing agent is programmed to receive from the NFV architecture a request for a first VNF. The VNF licensing agent is also programmed to transmit the request for the first VNF to a VNF license manager, wherein the request includes payment information. The VNF licensing agent is further programmed to receive a copy of the first VNF from the VNF license manager. In addition, the VNF licensing agent is programmed to transmit the copy of the first VNF to the NFV architecture, wherein the NFV architecture is configured to execute one or more instantiations of the first VNF.

In an embodiment, a method for secure management of licensing and distributing virtual network functions (VNF) is provided. The method is implemented by at least one processor in communication with at least one memory device. The method includes receiving a request for access to a first VNF from a virtual network. The virtual network is configured to execute the first VNF. The method also includes determining if the virtual network may access the first VNF based on one or more policies of a plurality of policies associated with the first VNF. If the virtual network may access the first VNF, the method includes retrieving the first VNF from a VNF repository and transmitting the first VNF to the virtual network.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
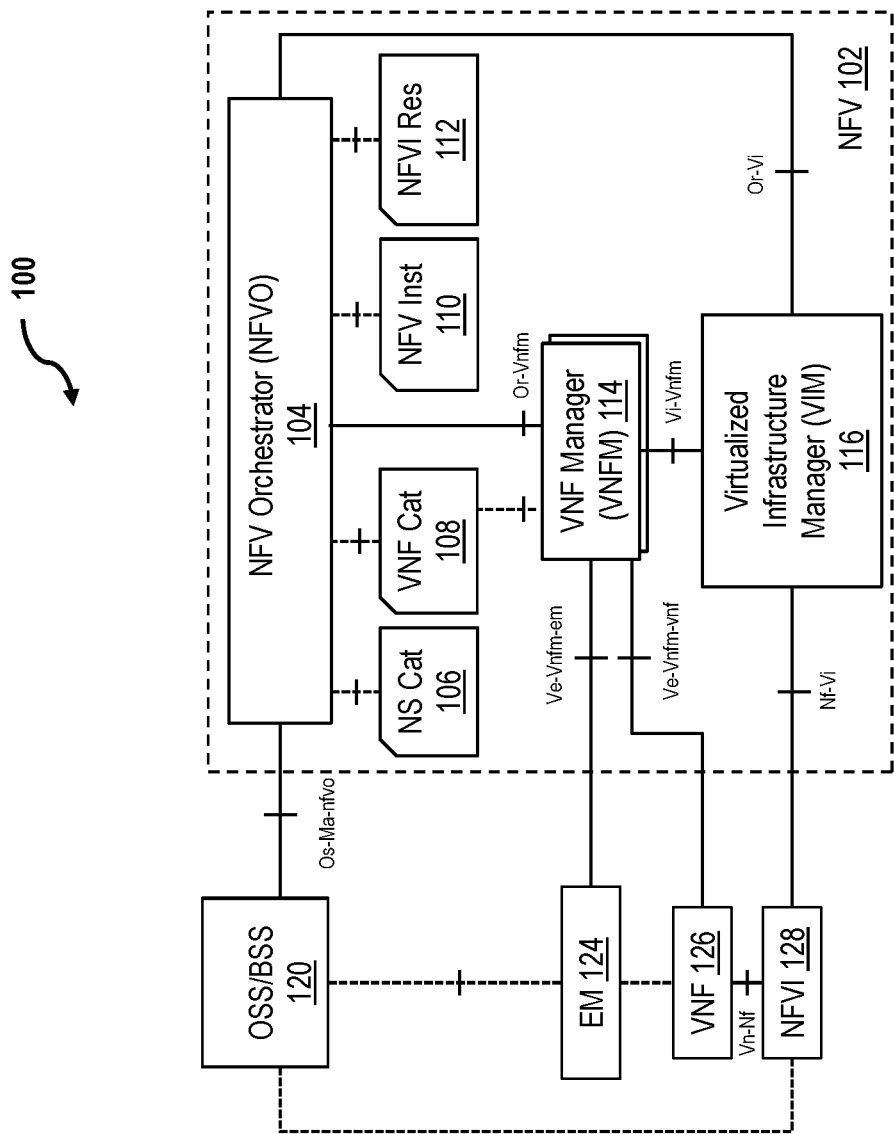
FIG. 1 is a schematic illustration of an exemplary computer network for an NFV architecture, in accordance with an embodiment of the disclosure.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc—read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The embodiments described herein provide innovative systems and methods for computer networks within NFV environments. The present embodiments introduce, among other solutions, techniques for communication between virtual network functions (VNF), virtual network function managers (VNFM), operations support systems/business support systems (OSS/BSS), and VNF vendors that sell and/or licenses access to one or more VNFs to ensure secure and efficient communication. The present embodiments are advantageously applicable in the ETSI NFV Management and Orchestration (MANO) environment and architecture.

Network Functions Virtualization (NFV) adds new capabilities to communications networks and requires a new set of management and orchestration functions to be added to the current model of operations, administration, maintenance and provisioning. In legacy networks, Network Function (NF) implementations are often tightly coupled with the infrastructure they run on. NFV decouples software implementations of Network Functions from the computation, storage, and networking resources they use. The virtualization insulates the Network Functions from those resources through a virtualization layer.

The decoupling exposes a new set of entities, the Virtualized Network Functions (VNFs), and a new set of relationships between them and the NFV Infrastructure (NFVI). VNFs can be chained with other VNFs and/or Physical Network Functions (PNFs) to realize a Network Service (NS).

The management and orchestration of virtualized resources are leveraged for providing VNFs with the resources they need. Resource allocation in the NFVI is a potentially complex task as a lot of requirements and constraints may need to be met simultaneously. Particularly requirements for network allocation add complexity compared to known resource allocation strategies for computing resources in virtualized environments. For example, some VNFs require low latency or high bandwidth links to other communication endpoints.

The systems and methods disclosed herein describe specific connections between the VNFs and the virtual network function manager (VNFM) to (i) improve security, (ii) increase efficiency, and (iii) ensure proper distribution. More specifically, the systems and methods describe a VNF license manager for controlling access to licensed VNFs. The VNF license manager supports standardized Application Programming Interface (API) transactions for dynamic license management. The VNF license manager moves distribution of VNFs and enforcement of VNF contracts to a centralized location. This allows the individual multiple system operators (MSO) and system operators to use standardized calls to access VNFs. This also allows for a standardized interface to handle different types of VNFs. In this manner the VNF license manager interfaces with each of the individual VNF vendors and provides a standardized interface to the MSOs and system operators. Therefore, the VNF license manager may act more like an app store for VNFs and reduce the amount of actions required on the part of the VNF consumer.

As the supply chain for VNFs becomes more complex, different VNF providers and users will attempt to implement different commercial licensing schemes. The systems described herein provide new network operations functionality to provide dynamic license management. This allows the NFV Infrastructure to support standardized API-based transactions for dynamic license management.

FIG. 1 is a schematic illustration of an exemplary computer network 100 for an NFV architecture 102. NFV architecture 102 represents, for example, a system according to the ETSI NFV Management and Orchestration (MANO) specification, and includes an NFV orchestrator (NFVO) 104, an NS catalog 106, a virtual network functions (VNF) catalog 108, NFV instances 110, NFVI resources 112, a VNF manager (VNFM) 114, and a virtualized infrastructure manager (VIM) 116.

In an exemplary embodiment, network 100 includes an operations support systems/business support systems (OSS/BSS) functional block 120 for and in communication with the NFV architecture 102. Network 100 also includes element managers (EM) 124, virtual network functions 126, and network functions virtualization infrastructure (NFVI) 128.

NFV orchestrator 104 orchestrates the NFVI resources across multiple VIMs 116 and manages the lifecycle of network services. NS Catalogue 106 represents the repository of all on-boarded Network Services and supports the creation and management of the network services deployable templates. VNF Catalogue 108 represents the repository of all of the on-boarded VNF packages and supports the creation and management of the VNF packages. NFV Instances 110 repository holds information of all VNF instances 126 and network service instances. Each VNF instance 126 is represented by a VNF record and each ES instance is represented by an ES record. These records are updated during the lifecycle of respective instances. NFVI Resources 112 repository holds information about available, reserved, and allocated NFVI resources as abstracted by VIM 116 across the operator's Infrastructure Domains.

VNFM 114 is responsible for the lifecycle management of VNF 126 instances. In some embodiments, VNFM 114 is assigned the management of a single VNF 126 instance. In the exemplary embodiment, VNFM 114 is assigned the management of a plurality of VNF 126 instances, of the same type or of different types. In some embodiments, VNFM 114 functions may be generic common functions applicable to any type of VNF 126. In other embodiments, some VNF 126 instances require specific functionality associated with their individual lifecycle. This functionality may be specified in the individual VNF's package.

In the exemplary embodiment, VNFM 114 performs multiple functions for each VNF 126 associated with it. These functions may include, but are not limited to, VNF instantiation (including VNF configuration), VNF instantiation feasibility checking, VNF instance software updates and upgrades, VNF instance modification, VNF instance scaling, VNF instance-related collection of NFVI performance measurement results, VNF instance healing, VNF instance termination, VNF lifecycle management change notification, management of the integrity of the VNF instance throughout its lifecycle, and the overall coordination and adaption role for configuration and event reporting between VIM 116 and EM 124.

VIM 116 is responsible for controlling NFVI 128 resources. OSS/BSS 120 are a combination of the operator's other operations and business support functions that are not explicitly captures by NFV 102. EM 124 is responsible for the FCAPS management functionality of a VNF 126. FCAPS stands for "Fault Management, Configuration Management, Accounting Management, Performance Management, and Security Management." EM 124 performs functions such as, but not limited to, configuration for the network functions provided by VNF 126, fault management for the network functions provided by VNF 126, accounting for the usage of the VNF functions, collecting performance measurement results for the functions provided by VNF 126, and security management for the VNF functions. In some embodiments, EM 124 collaborates with VNFM 114 to perform those functions that require exchanges of information regarding the NFVI resources associated with VNF 126. NFVI 128 encompasses the hardware and software components that provided the infrastructure resources where VNFs 126 are deployed.

Figure 2:
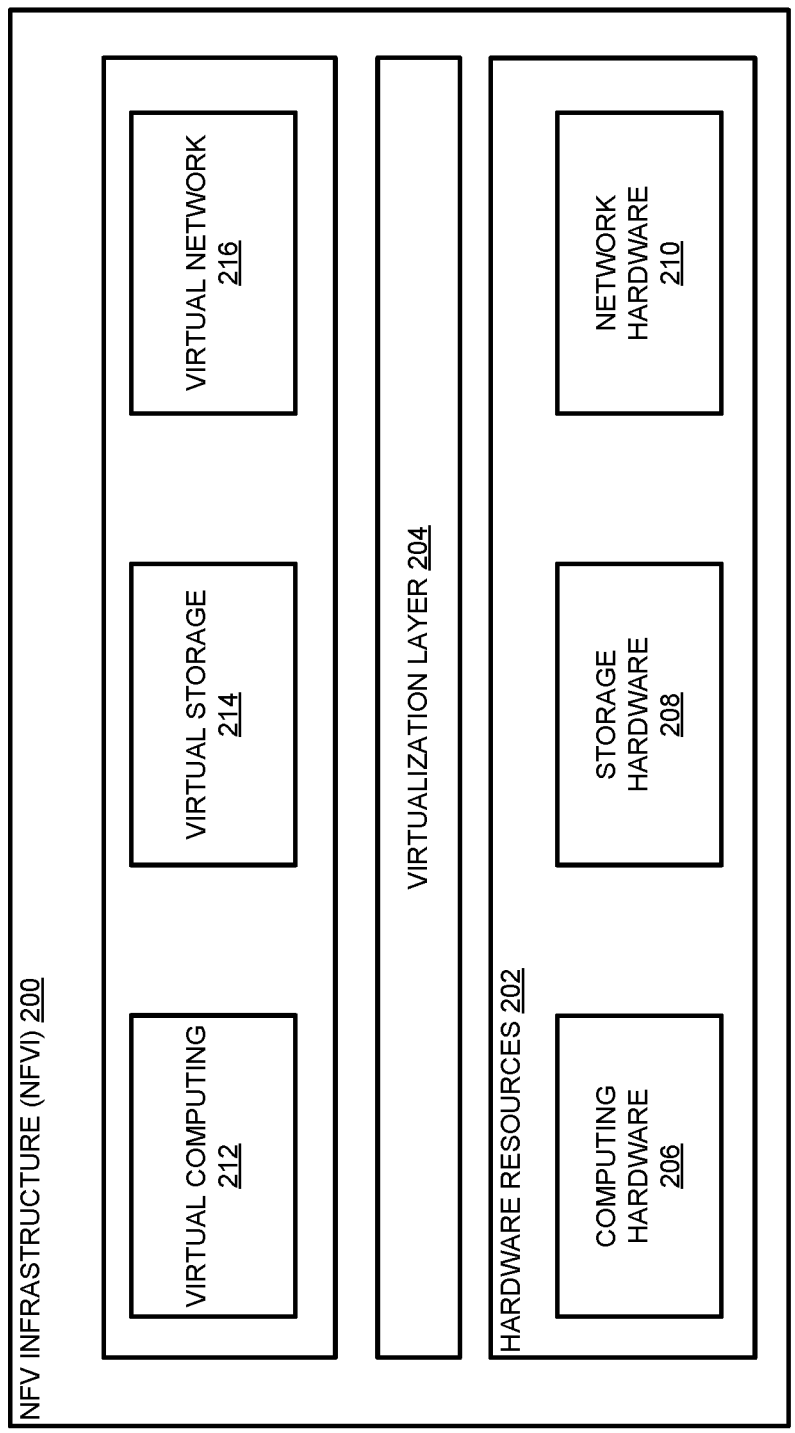
FIG. 2 is a schematic illustration of the NFV infrastructure shown in FIG. 1.

FIG. 2 is a schematic illustration of an NFVI 200. In an exemplary embodiment, NFVI 200 is similar to NFVI 128 (shown in FIG. 1). In the exemplary embodiment, NFVI 200 describes the hardware and software components on which the virtual networks are built.

NFVI 200 virtualizes network services rather than operating them on proprietary dedicated hardware. NFVI 200 treats hardware resources 202 as commodity hardware that runs software to accomplish functions such as routing, and firewalls. NFVI 200 executes a virtualization layer 204 where computing hardware 206, storage hardware 208, and network hardware 210 are used to perform virtual computing 212, virtual storage 214, and virtual networks 216. NFVI 200 acts as an interface between hardware resources 202 and VNFs 126 (shown in FIG. 1) that are desired to be executed.

Figure 3:
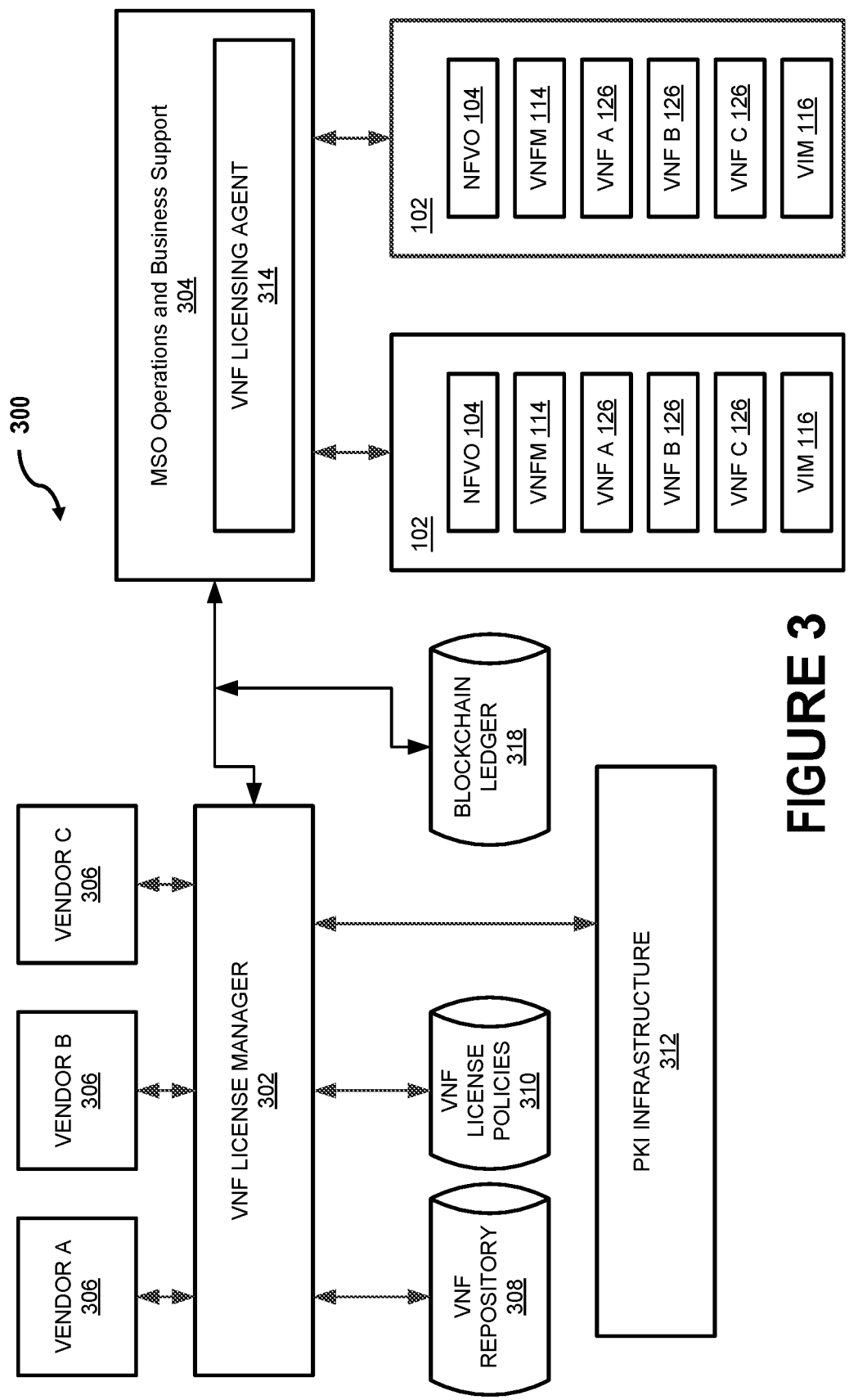
FIG. 3 is a schematic illustration of a VNF Licensing Architecture, in accordance with an embodiment of the disclosure.

FIG. 3 is a schematic illustration of a VNF Licensing Architecture 300, in accordance with an embodiment of the disclosure. In the exemplary embodiment, VNF Licensing Architecture 300 acts as an interface between VNF vendors and NFV architecture 102 (shown in FIG. 1) for a multiple system operator (MSO), such as a cable operator.

In the exemplary embodiment, VNF License Manager 302 is in communication with an MSO Operations and Business support systems 304, and with a plurality of vendors 306, such as Vendor A, B, & C. Each vendor 306 provides one or more VNFs 126. VNF License Manager 302 interacts with individual vendors 306 to provide access to their VNFs 126 to NFV architecture 102 associated with the individual MSOs. VNF License Manager 302 stores images of individual VNFs 126 in a VNF repository 308, and stores the policies associated with each VNF 126 and corresponding vendor 306 in a VNF license policies database 310. VNF repository 308 acts as an app store for individual VNFs 126, where an MSO or NFV architecture 102 may request a copy of a particular VNF 126 stored in VNF repository 308. In the exemplary embodiment, VNF License Manager 302 receives updates to VNFs 126 and stores those updated VNFs 126 in VNF repository 308. Furthermore, VNF License Manager 302 may provide the updated VNFs 126 to those NFV architectures 102 that are currently using or licensing to use the updated VNF 126.

In the exemplary embodiment, VNF License Manager 302 interfaces with the MSO or NFV architecture 102 through MSO Operations and Business support systems 304, which may be similar to OSS/BSS functional block 120 (shown in FIG. 1). In the exemplary embodiment, MSO Operations and Business support systems 304 includes a VNF licensing agent 314, which acts as an interface between VNF License Manager 302 and NFV architectures 102.

In the exemplary embodiment, VNF licensing agent 314 requests access to a particular VNF 126 from VNF License Manager 302. VNF License Manager 302 provides VNF licensing agent 314 with access to a copy of VNF 126 from VNF repository 308. VNF licensing agent 314 provides VNF License Manager 302 with payment for access to VNF 126. VNF License Manager 302 routes the payment to a particular vendor 306 associated with VNF 126. In some embodiments, VNF License Manager 302 keeps a portion of the payment as a management fee.

In the exemplary embodiment, VNF licensing agent 314 also provides VNF License Manager 302 with information about the usage of VNF 126 by its NFV architectures 102. VNF License Manager 302 compares the usage information with the policy for VNF 126 from VNF license policies database 310. VNF License Manager 302 determines if there is a violation of the policies and then determines if VNF licensing agent 314 may continue to access VNF 126.

In some embodiments, the communications between VNF License Manager 302 and VNF licensing agent 314 may be viewed and stored by a blockchain ledger 318. For example, the blockchain ledger 318 may keep track of the payments, usage information, and other provided information, which allows for an immutable set of records for VNF 126. In some embodiments, blockchain ledger 318 may be accessible by one or more of VNF License Manager 302, VNF licensing agent 314, and a particular vendor 306 associated with that VNF 126. In some embodiments, there is a single ledger for each vendor 306. In other embodiments, there is a ledger for each VNF 126. In still other embodiments, multiple VNFs 126 from multiple vendors 306 may be monitored in a single ledger 318, and each individual vendor 306 may only have access to those records associated with their own VNFs 126.

In the exemplary embodiments, VNF license manager 302, and communications with VNF licensing agent 314, are protected using a public key infrastructure (PKI) 312. In some further embodiments, VNF repository 308 and VNF license policy database 310 are also protected by PKI 312.

The above system allows for the separation of the software cycle of functionality from the hardware cycle. In the exemplary embodiment, racks of servers may be running thousands of VNFs. According to the advantageous embodiments described herein, the software lifecycle may be completely decoupled from the hardware lifecycle as NFVI 128 provides the interface between hardware resources 202 and VNFs 126. By these innovative techniques, many different vendors 306 will be potentially enabled to provide VNFs 126, which is significantly advantageous for smaller vendors. This advantageous separation of software cycles from hardware cycles further enables users to dynamically change software to meet new service needs without having to upgrade the associated hardware.

The systems described herein allow for management of the diversity of licensing management mechanism that exists across multiple VNF vendors 306. VNF License Manager 302 may provide the interface to multiple VNF vendors 306 and handle the variety of different interfaces through a single manager, thus removing that requirement from NFV architecture 102. Furthermore VNF License Manager 302 may handle the updates to VNFs 126, which allows VNF License Manager 302 to provide the latest version of VNF 126 to the interested VNF architecture 102. More complication and diversity in vendors 306 makes provisioning and license renewal a more complex, error-prone, and time-consuming process. The complication and diversity also inhibits automation and may potentially lead to service outages. Thus the goal of this system is to provide interoperability for automated license management transaction between service providers and vendors.

The systems described herein allow all VNFs 126 to use the same licensing methods, mechanisms, and protocols by communicating with a single point, VNF License Manager 302. VNF License Manager 302 provides a consistent interface for VNF vendors 306. The systems described herein, through VNF License Manager 302, provide a fully automated license management process requiring no manual intervention. VNF License Manager 302 is also scalable to handle a large number of VNF instances.

In some embodiments, VNF License Manager 302 prevents service outages due to administrative errors by defaulting VNFs to running and being active. VNF License Manager 302 may also support multiple different VNF licensing models, such as, but not limited to, periodic billing, usage billing, and one-time payment. VNF License Manager 302 may also keep the accounting of the usage of the VNF separate from the billing. Furthermore, the usage data could be authenticated and auditable, such as through the use of one or more blockchain ledgers 318.

In the exemplary embodiment, system 300 is implemented for secure management of licensing and distributing virtual network functions (VNF). System 300 includes VNF license manager 302, VNF repository 308 for storing a plurality of VNFs including a first VNF 126, and VNF license database 310 for storing a plurality of polices associated with the plurality of VNFs. VNF license manager 302 is in communication with VNF repository 308 and VNF license database 310.

In the exemplary embodiment, VNF license manager 302 is programmed to receive a request for access to the first VNF 126 from a virtual network, such as NFV architecture 102. The virtual network is configured to execute the first VNF 126. In the exemplary embodiment, the request may be received from VNF licensing agent 314. VNF license manager 302 determines if the virtual network may access the first VNF 126 based on one or more policies of the plurality of policies associated with the first VNF 126. If the virtual network may access the first VNF 126, VNF license manager 302 retrieves the first VNF 126 from VNF repository 308 and transmits the first VNF 126 to the virtual network.

In some embodiments, VNF license manager 302 receives usage information about the virtual network and the first VNF 126. VNF license manager 302 analyzes the usage information in view of the one or more policies associated with the first VNF 126. VNF license manager 302 transmits a message indicating that the first VNF 126 is no longer usable by the virtual network based on the usage information. In some embodiments, VNF license manager 302 calculates billing information based on the analysis of the usage information.

In some further embodiments, VNF license manager 302 receives an updated version of the first VNF 126 from a computer device of vendor 306. VNF license manager 302 stores the updated version of the first VNF 126 in VNF repository 308. VNF license manager 302 transmits the updated version of the first VNF 126 to the virtual network.

In some other embodiments, in the case where system 300 also includes blockchain ledger 318, VNF license manager 302 may be configured to store a plurality of communications with the virtual network in blockchain ledger 318.

In some embodiments, VNF license manager 302 transmits a copy of the one or more policies associated with the first VNF 126 to the virtual network. VNF license manager 302 then receives acknowledgement of receipt of the one or more policies by the virtual network. VNF license manager 302 transmits the first VNF 126 to the virtual network upon receipt of the acknowledgement.

In the exemplary embodiment, in the case where system 300 also includes VNF licensing agent 314, VNF licensing agent 314 may be in communication with at least one NFV architecture 102. VNF licensing agent 314 receives from NFV architecture 102 a request for a first VNF 126. VNF licensing agent 314 transmits the request for the first VNF 126 to VNF license manager 302. In some embodiments, the request includes payment information. VNF licensing agent 314 receives a copy of the first VNF 126 from VNF license manager 302. VNF licensing agent 314 transmits the copy of the first VNF 126 to NFV architecture 102. NFV architecture 102 is configured to execute one or more instantiations of the first VNF 126.

In some embodiments, VNF licensing agent 314 receives usage information associated with the first VNF 126 from NFV architecture 102. VNF licensing agent 314 transmits the usage information to VNF license manager 302.

In some embodiments, VNF licensing agent 314 receives a request to access the first VNF 126 from a second NFV architecture 102. VNF licensing agent 314 transmits the copy of the first VNF 126 to the second NFV architecture 102. The second NFV architecture 102 is configured to execute one or more instantiations of the first VNF 126.

In some further embodiments, the VNF licensing agent 314 receives an updated copy of the first VNF 126 from VNF license manager 302. VNF licensing agent 314 transmits the updated copy of the first VNF 126 to the first NFV architecture 102 and the second NFV architecture 102. The first NFV architecture 102 and the second NFV architecture 102 are configured to halt execution of the instantiations of the first VNF 126 and execute instantiations of the updated VNF 126.

In still further embodiments, VNF licensing agent 314 receives policy information associated with the first VNF 126 from VNF license manager 302. VNF licensing agent 314 stores the policy information associated with the first VNF 126. VNF licensing agent 314 transmits an acknowledgement of the policy information to VNF license manager 302.

In some embodiments, VNF licensing agent 314 receives a message indicating that the first VNF 126 is no longer usable. VNF licensing agent 314 transmits the message indicating that the first VNF 126 is no longer usable to NFV architecture 102. In this case, NFV architecture 102 may be configured to halt execution of instantiations of the first VNF 126.

As the supply chain for VNFs becomes more complex, different VNF providers and users will attempt to implement different commercial licensing schemes. The systems described herein provide new network operations functionality to provide dynamic license management, which advantageously allows the NFVI to support standardized API-based transactions for dynamic license management.

According to the several embodiments described herein, separate management infrastructure and hosted infrastructure in an NFV environment may be centrally implemented in a variety of different technological environments, and without requiring any structural (i.e., hardware) changes to the computer networks of such technological environments. The present embodiments therefore provide significant advantages over computer network environments with combined or intertwined infrastructures.

Exemplary embodiments of systems and methods for separate management infrastructure and hosted infrastructure in an NFV environment are described above in detail. The systems and methods of this disclosure though, are not limited to only the specific embodiments described herein, but rather, the components and/or steps of their implementation may be utilized independently and separately from other components and/or steps described herein.

Although specific features of various embodiments of the disclosure may be shown in some drawings and not in others, this convention is for convenience purposes and ease of description only. In accordance with the principles of the disclosure, a particular feature shown in a drawing may be referenced and/or claimed in combination with features of the other drawings. For example, the following list of example claims represents only some of the potential combinations of elements possible from the systems and methods described herein.

The computer-implemented methods discussed herein may include additional, less, or alternate actions, including those discussed elsewhere herein. The methods may be implemented via one or more local or remote processors, transceivers, and/or sensors (such as processors, transceivers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

The improvements described herein may be achieved by performing one or more of the following steps: (a) receive a request for access to the first VNF from a virtual network, wherein the virtual network is configured to execute the first VNF; (b) determine if the virtual network may access the first VNF based on one or more policies of the plurality of policies associated with the first VNF; (c) if the virtual network may access the first VNF, retrieve the first VNF from the VNF repository and transmit the first VNF to the virtual network; (d) receive usage information about the virtual network and the first VNF; (e) analyze the usage information in view of the one or more policies associated with the first VNF; (f) transmit a message indicating that the first VNF is no longer usable by the virtual network based on the usage information; (g) calculate billing information based on the analysis of the usage information; (f) receive an updated version of the first VNF from a vendor computer device; (g) store the updated version of the first VNF in the VNF repository; (h) transmit the updated version of the first VNF to the virtual network; (i) store a plurality of communications with the virtual network in a blockchain ledger; (j) transmit a copy of the one or more policies associated with the first VNF to the virtual network; (k) receive acknowledgement of receipt of the one or more policies by the virtual network; and (l) transmit the first VNF to the virtual network upon receipt of the acknowledgement.

The improvement may also be achieved by performing one or more of the following steps: (a) receive from the NFV architecture a request for a first VNF; (b) transmit the request for the first VNF to a VNF license manager, wherein the request includes payment information; (c) receive a copy of the first VNF from the VNF license manager; (d) transmit the copy of the first VNF to the NFV architecture, wherein the NFV architecture is configured to execute one or more instantiations of the first VNF; (e) receive usage information associated with the first VNF from the NFV architecture; (f) transmit the usage information to the VNF license manager; (g) receive a request to access the first VNF from a second NFV architecture; (h) transmit the copy of the first VNF to the second NFV architecture, wherein the second NFV architecture is configured to execute one or more instantiations of the first VNF; (i) receive an updated copy of the first VNF from the VNF license manager; (j) transmit the updated copy of the first VNF to the NFV architecture and the second NFV architecture, wherein the NFV architecture and the second NFV architecture are configured to halt execution of the instantiations of the first VNF and execute instantiations of the updated VNF; (k) receive policy information associated with the first VNF from the VNF license manager; (l) store the policy information associated with the first VNF; (m) transmit an acknowledgement of the policy information to the VNF license manager; (n) receive a message indicating that the first VNF is no longer usable; and (o) transmit the message indicating that the first VNF is no longer usable to the NFV architecture, wherein the NFV architecture is configured to halt execution of instantiations of the first VNF.

The aspects described herein may be implemented as part of one or more computer components such as a client device and/or one or more back-end components, such as a host device, for example. Furthermore, the aspects described herein may be implemented as part of a computer network architecture and/or a cognitive computing architecture that facilitates communications between various other devices and/or components. Thus, the aspects described herein address and solve issues of a technical nature that are necessarily rooted in computer technology.

For instance, aspects include routing communications between separate networks to ensure security, distribution, and management of VNFs that may be provided by third-party vendors. In doing so, the aspects overcome issues associated with having to have individual virtual networks deal with a plurality of different interfaces for a plurality of different vendors of VNFs. Furthermore, these aspects reduce the chance of data compromise and allow for proper access to the VNFs in accordance with their policies. Without the improvements suggested herein, additional processing and memory usage, or even direct human intervention, would be required to perform such activities. Additional technical advantages include, but are not limited to: i) improved speed and responsiveness in providing and updating VNFs; ii) improved monitoring for compliance with policies; iii) allowing the virtual network function infrastructure to interface with new VNF vendors without requiring specialized interfaces; iv) reducing the chance of malicious communications and VNFs; v) allowing for protected two-way communication between the vendor and the user; and vi) preventing the VNFIs from having direct access to the vendors. Additional technical advantages are described in other sections of the specification.

Furthermore, the embodiments described herein improve upon existing technologies, and improve the functionality of computers, by more accurately predict or identify the current security status of any connected device. The present embodiments improve the speed, efficiency, and accuracy in which such calculations and processor analysis may be performed. Due to these improvements, the aspects address computer-related issues regarding efficiency over conventional techniques. Thus, the aspects also address computer related issues that are related to computer security, for example.

Accordingly, the innovative systems and methods described herein are of particular value within the realm of virtual network functions, which have been historically associated with a poor record of securing communications and data. The present embodiments enable more reliable updating and control of such functions, but without compromising data and communications. Furthermore, according to the disclosed techniques, the monitoring and updating of virtual network functions in greatly improved to improve the security, distribution, and support of these functions, the associated computer devices, and the associated computer networks.

Exemplary embodiments of systems and methods for separating license management entities from the hosted infrastructure are described above in detail. The systems and methods of this disclosure though, are not limited to only the specific embodiments described herein, but rather, the components and/or steps of their implementation may be utilized independently and separately from other components and/or steps described herein.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented system for secure management of licensing and distributing a virtual network functions (VNF) over a network function virtualization (NFV) management and orchestration (MANO) architecture, comprising:
    a VNF license manager;
    a VNF repository for storing a plurality of VNFs including a first VNF; and
    a VNF license database for storing a plurality of policies associated with the plurality of VNFs,
    wherein the VNF license manager is in communication with the VNF repository and the VNF license database, and
    wherein the system further comprises (i) a processor, and (ii) a memory having computer-executable instructions encoded therein, which, when executed by the processor, cause the VNF license manager to:
       receive a request for access to the first VNF from a virtual network, wherein the virtual network is configured to execute the first VNF;
       determine if the virtual network may access the first VNF based on one or more policies of the plurality of policies associated with the first VNF, wherein, if the virtual network may access the first VNF, retrieve the first VNF from the VNF repository and transmit the first VNF to the virtual network;
       transmit a copy of the one or more policies associated with the first VNF to the virtual network;
       receive acknowledgement of receipt of the one or more policies by the virtual network; and
       transmit the first VNF to the virtual network upon receipt of the acknowledgement.

2. The system of claim 1, wherein the instructions further cause the VNF license manager to:
receive usage information about the virtual network and the first VNF; and
analyze the usage information in view of the one or more policies associated with the first VNF.

3. The system of claim 2, wherein the instructions further cause the VNF license manager to transmit a message indicating that the first VNF is no longer usable by the virtual network based on the usage information.

4. The system of claim 2, wherein the instructions further cause the VNF license manager to calculate billing information based on the analysis of the usage information.

5. The system of claim 1, wherein the instructions further cause the VNF license manager to:
receive an updated version of the first VNF from a vendor computer device;
store the updated version of the first VNF in the VNF repository; and
transmit the updated version of the first VNF to the virtual network.

6. The system of claim 1, further comprising a blockchain ledger, and wherein the instructions further cause the VNF license manager to store a plurality of communications with the virtual network in the blockchain ledger.

7. The system of claim 1, wherein the instructions further cause the VNF license manager to:
receive a message indicating that the first VNF is no longer usable; and
transmit the message indicating that the first VNF is no longer usable to the NFV architecture, wherein the NFV architecture is configured to halt execution of instantiations of the first VNF.

8. A computer-implemented operations and business support system (OSS/BSS) including a virtual network function (VNF) licensing agent in communication with at least one network function virtualization (NFV) management and orchestration (MANO) architecture, comprising:
a processor; and
a memory having computer-executable instructions encoded therein, which, when executed by the processor, cause the VNF licensing agent to:
receive from the NFV architecture a request for a first VNF;
transmit the request for the first VNF to a VNF license manager, wherein the request includes payment information;
receive a copy of the first VNF from the VNF license manager;
transmit the copy of the first VNF to the NFV architecture, wherein the NFV architecture is configured to execute one or more instantiations of the first VNF;
receive policy information associated with the first VNF from the VNF license manager;
store the policy information associated with the first VNF; and
transmit an acknowledgement of the policy information to the VNF license manager.

9. The OSS/BSS in accordance with claim 8, wherein the instructions further cause the VNF licensing agent to:
receive usage information associated with the first VNF from the NFV architecture; and
transmit the usage information to the VNF license manager.

10. The OSS/BSS in accordance with claim 8, wherein the instructions further cause the VNF licensing agent to:
receive a request to access the first VNF from a second NFV architecture; and
transmit the copy of the first VNF to the second NFV architecture, wherein the second NFV architecture is configured to execute one or more instantiations of the first VNF.

11. The OSS/BSS in accordance with claim 10, wherein the instructions further cause the VNF licensing agent to:
receive an updated copy of the first VNF from the VNF license manager;
transmit the updated copy of the first VNF to the NFV architecture and the second NFV architecture, wherein the NFV architecture and the second NFV architecture are configured to halt execution of the instantiations of the first VNF and execute instantiations of the updated VNF.

12. A method for secure management of licensing and distributing a virtual network functions (VNF) implemented by at least one processor in communication with at least one memory device, the method comprising:
receiving a request for access to a first VNF from a virtual network, wherein the virtual network is configured to execute the first VNF;
determining if the virtual network may access the first VNF based on one or more policies of a plurality of policies associated with the first VNF, wherein, if the virtual network may access the first VNF, retrieving the first VNF from a VNF repository and transmitting the first VNF to the virtual network;
transmitting a copy of the one or more policies associated with the first VNF to the virtual network;
receiving acknowledgement of receipt of the one or more policies by the virtual network; and
transmitting the first VNF to the virtual network upon receipt of the acknowledgement.

13. The method of claim 12, further comprising:
receiving usage information about the virtual network and the first VNF; and
analyzing the usage information in view of the one or more policies associated with the first VNF.

14. The method of claim 13, further comprising transmitting a message indicating that the first VNF is no longer usable by the virtual network based on the usage information.

15. The method of claim 13, further comprising calculating billing information based on the analysis of the usage information.

16. The method of claim 12, further comprising:
receiving an updated version of the first VNF from a vendor computer device;
storing the updated version of the first VNF in the VNF repository; and
transmitting the updated version of the first VNF to the virtual network.

17. The method of claim 12, further comprising storing a plurality of communications with the virtual network in a blockchain ledger.

* * * * *